United States Patent [19]
Martwick

[11] Patent Number: 5,821,779
[45] Date of Patent: Oct. 13, 1998

[54] CONSTANT FREQUENCY COMPUTER BUS

[75] Inventor: Andrew Wayne Martwick, Folsom, Calif.

[73] Assignee: Intel Corporation, Santa Clara, Calif.

[21] Appl. No.: 723,908

[22] Filed: Sep. 30, 1996

[51] Int. Cl.$^6$ .................................................... H03K 5/22
[52] U.S. Cl. .............................. 327/63; 327/114; 327/564
[58] Field of Search .................................. 327/564, 565, 327/566, 63, 68, 113, 114, 170

[56] References Cited

U.S. PATENT DOCUMENTS

| | | | |
|---|---|---|---|
| 3,866,130 | 2/1975 | Krause | 327/68 |
| 5,502,411 | 3/1996 | Matsuki et al. | 327/113 |
| 5,585,750 | 12/1996 | Noguchi et al. | 327/113 |

*Primary Examiner*—Toan Tran
*Attorney, Agent, or Firm*—Kenyon & Kenyon

[57] ABSTRACT

A constant frequency computer bus includes a sinusoidal wave generator that generates a sinusoidal wave. The sinusoidal wave generator is coupled to a reference line and a plurality of bus lines, and these lines transmit the sinusoidal wave. A plurality of amplitude modifiers are coupled to each of the bus lines. The amplitude modifiers modify the amplitude of the sinusoidal wave transmitted on the bus lines depending on whether a digital "1" or "0" is required to be driven on the bus lines. An additional amplitude modifier is coupled to the reference line to modify the amplitude of the sinusoidal wave transmitted on the reference line. A plurality of comparators are coupled to the reference line and each bus line. The comparators read the digital data on the bus line by comparing the amplitude of the sinusoidal wave transmitted on the bus line with the amplitude of the sinusoidal wave transmitted on the bus line. A digital output is generated based upon the comparison.

26 Claims, 5 Drawing Sheets

CONSTANT FREQUENCY COMPUTER BUS

BACKGROUND OF THE INVENTION

The present invention is directed to a computer bus and, more particularly, to a computer bus operated at a constant frequency.

A computer bus enables a central processing unit (CPU) in a computer system to access memory and peripheral devices. FIG. 1 provides an example of a computer system that includes a computer bus. In FIG. 1, a CPU 10 is coupled to a 32-bit bus 14 through a bus driver/receiver module 12. The bus 14 includes 32 lines $D_0$–$D_{31}$. A memory 20 is also coupled to lines $D_0$–$D_{31}$ of the bus 14 through a bus driver/receiver module 22. Other components coupled to the bus 14 do not require 32 bits. Therefore, these devices do not utilize all 32 lines $D_0$–$D_{31}$ of bus 14. Specifically, a disk drive 24, which is a 16-bit device, is coupled through its associated bus driver/receiver 26 to lines $D_0$–$D_{15}$ of bus 14. Further, a serial input/output (I/O) device 28 is an 8-bit device, and is coupled through its associated bus driver/receiver 30 to lines $D_0$–$D_7$ of bus 14. The bus driver/receiver modules 12, 22, 26, 30 include a bus driver/receiver (not shown) corresponding to each line of the bus 14 coupled to their associated devices. The bus driver/receivers send data onto the bus 14 and receive data from the bus 14.

FIG. 2 provides a detailed view of a bus driver/receiver 29 in the CPU 10 for line $D_0$ of bus 14. The bus driver/receiver 29 is identical to all of the bus driver/receivers coupled to bus 14 in the computer system. The driver section 38 comprises a totem-pole arrangement of transistors. A totem-pole arrangement is typically used because it switches very fast and can source a large amount of current to the bus 14. Voltage input at line 40 determines whether a digital "1" or "0" is output on line $D_0$ of bus 14. The receiver section includes a driver 36 which receives data through line 34.

Signal diagram 30 illustrates the format of the signal on bus 14. A digital "1" is represented as five volts, and a digital "0" is represented by zero volts. The signal 31 present on the bus 14 is in the form of a square wave as digital data is switched from "1" to "0" and from "0" to "1".

There are several problems with the prior art bus 14. One problem is the presence of signal skew on the bus 14. Signal skew is caused by a variety of factors. For example, unequal loads on the bus lines $D_0$–$D_{31}$ cause signal skew. An unequal load is illustrated in FIG. 1. Bus lines $D_0$–$D_7$ have a load of three devices: the memory 20, the disk drive 24 and the serial I/O 28. In contrast, bus lines $D_{16}$–$D_{31}$ only have a load of the memory 20. Additional conditions can also cause unequal loads on each of the bus lines $D_0$–$D_{31}$. Signal skew is also caused by different lengths of the bus lines $D_0$–$D_{31}$. Bus lines can differ in length due to the layout of the bus lines on a circuit board. Different lines take different paths on the circuit board due to the location of various components.

Signal skew is a problem because it causes the signals on lines $D_0$–$D_{31}$ to arrive at their destination at different times. This can negatively affect the timing of the entire computer system. For example, if the CPU 10 in FIG. 1 must read a 16-bit word from disk drive 24, the CPU 10 must wait until all of the signals have arrived on bus lines $D_0$–$D_{15}$ before performing the read operation. Therefore, the read operation cannot be performed until the signal has arrived from the slowest bus line $D_0$–$D_{15}$.

A second problem with the prior art bus 14 is that it generates a large amount of electromagnetic interference (EMI). The signal on the bus 14 is in the form of the square wave 31 shown in FIG. 2. A square wave is formed from an infinite series of sinusoidal waves, each sinusoidal wave having a different frequency or harmonic. EMI is radiated by each sinusoidal harmonic. Therefore, the total EMI radiated by all of the sinusoidal waves added together is extremely large. In order to shield the EMI radiation, the computer system must be placed in an expensive box. Further, the presence of EMI requires the computer system to undergo an expensive and time consuming certification by the Federal Communication Commission (FCC) before it can be sold.

A third problem with the prior art bus 14 is that the bus 14 must be prevented from floating when it is not being used. Floating on a bus line occurs when no devices in the computer system are driving either a "1" or "0" on that line. If a bus is floating, it will drive excessive current, which will cause excessive current draw for the entire computer system. Therefore, various pull-up and pull-down loads such as the pull-down load 32 shown in in FIG. 2 must be coupled to the bus 14 to prevent the bus 14 from floating and prevent excessive current draw. These loads are expensive and, although they prevent excessive current draw, they still increase the current needed to drive the bus 14. The need for increased current increases the power consumption of the computer system. In addition, the added loads increase the signal skew problem previously described.

A fourth problem with the prior art bus 14 is reflection. Reflection is caused by unbalanced loads on bus lines $D_0$–$D_{31}$ and increases as the frequency or speed of the square wave 31 increases. In order to balance the loads, and therefore reduce reflection, the bus lines $D_0$–$D_{31}$ must either be tuned or terminated. Tuning the bus lines $D_0$–$D_{31}$ is extremely difficult due to the infinite amount of harmonics present in the square wave 31. Therefore, the reflection must be reduced by terminating the bus 14. However, termination increases the amount of current needed to drive the bus 14. This increases the power consumption of the computer system. In addition, the reflection limits the frequency at which a portable computer system can be operated. Specifically, a bus 14 in a portable computer that is operated at a high frequency requires a large amount of termination. As the frequency increases, the amount of termination becomes so large that a prohibitively large amount of current, more than is available in a portable computer, is required drive the bus 14.

Based on the foregoing, there is a need for an improved computer bus that does not have signal skew and that has reduced EMI radiation. Further, there is a need for an improved computer bus in which floating is prevented without using pull-up or pull-down loads, and that is easily tunable so reflection can be eliminated without using termination.

SUMMARY OF THE INVENTION

These and other needs are achieved by the method and apparatus of the present invention.

The present invention is a constant frequency computer bus, and a computer system that includes the constant frequency bus. The bus includes a sinusoidal wave generator that generates a sinusoidal wave. The sinusoidal wave generator is coupled to a reference line and a plurality of bus lines, and these lines transmit the sinusoidal wave. An plurality of amplitude modifiers are coupled to the bus line. The amplitude modifiers modify the amplitude of the sinusoidal wave transmitted on the bus lines depending on whether a digital "1" or "0" is required to be driven on the bus lines. An additional amplitude modifier is coupled to the reference line to modify the amplitude of the sinusoidal wave transmitted on the reference line. A plurality of comparators are coupled to the reference line and bus line. The comparators read the digital data on the bus line by comparing the amplitude of the sinusoidal wave transmitted on the bus line with the amplitude of the sinusoidal wave transmitted on the bus line. A digital output is generated based upon the comparison.

DETAILED DESCRIPTION

Figure 3:
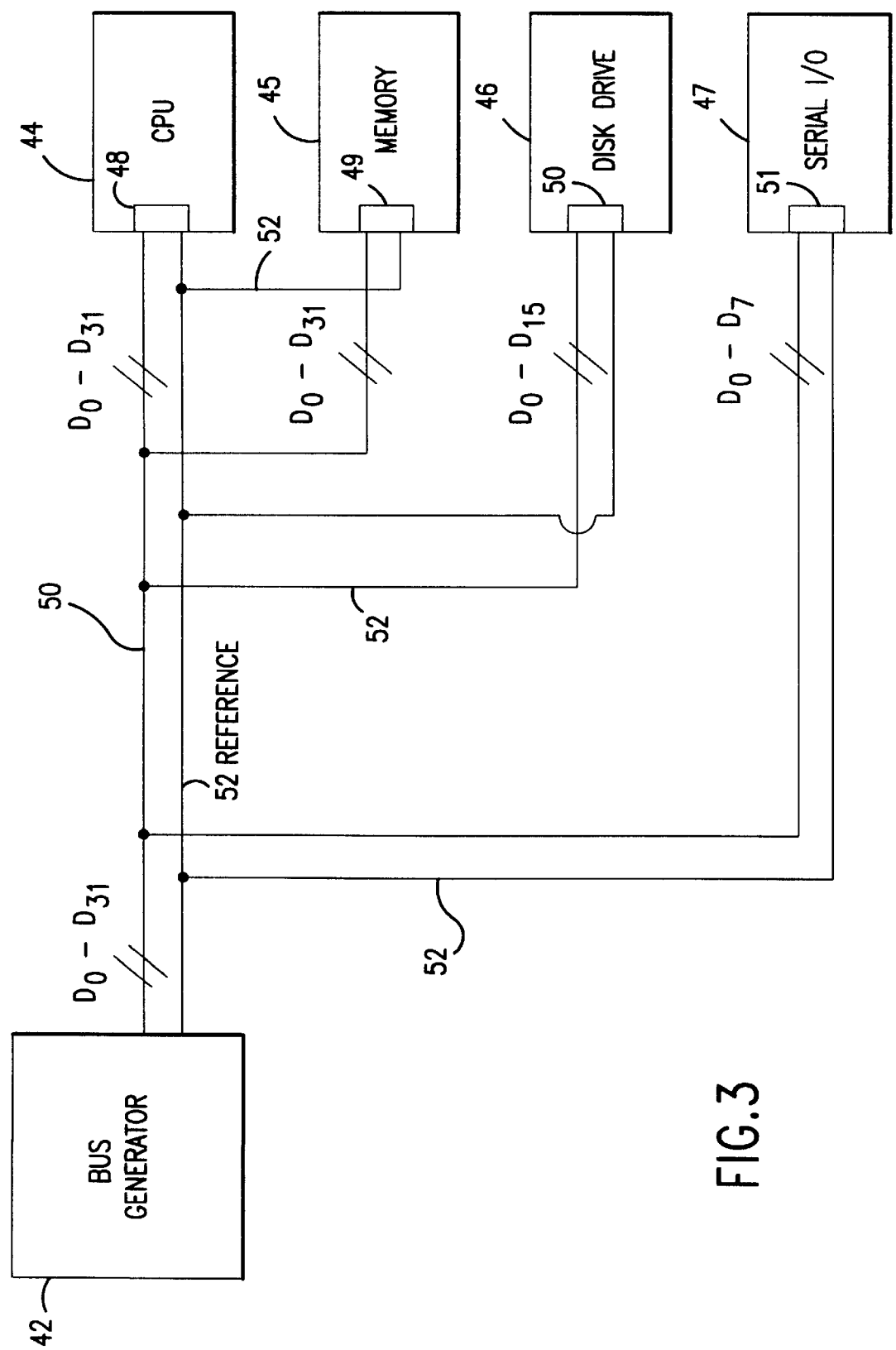
FIG. 3 is a block diagram of computer system that includes the computer bus of the present invention.

FIG. 3 provides an example of a computer system that includes the computer bus of the present invention. In FIG. 3, a bus generator 42 is coupled to a 32-bit bus 50. The bus generator 42 generates signals for the entire bus 50. The bus generator 42 is also coupled to a reference line 52. The bus generator 42 generates a reference signal that is transmitted on the reference line 52. The bus 50 includes 32 lines $D_0$–$D_{31}$. A CPU 44 and a memory 45 are coupled to all 32 lines of the bus 50 through bus driver/receiver module 48 and bus driver/receiver module 49, respectively. A disk drive 46 is coupled through bus driver/receiver module 50 to lines $D_0$–$D_{15}$ of the bus 50, and a serial I/O is coupled through bus driver/receiver module 51 to lines $D_0$–$D_7$ of the bus 50. Each bus driver/receiver module 48–51 includes a plurality of bus driver/receivers, one corresponding to each line of the bus 50. Each bus driver/receiver module 48–51 is also coupled to the reference line 52.

The bus generator 42 is preferably a separate component of the computer system, as shown in FIG. 3, but it could be integrated within the CPU 44 or any other component. However, there should preferably be only a single bus generator 42 for an entire bus 50.

Figure 1:
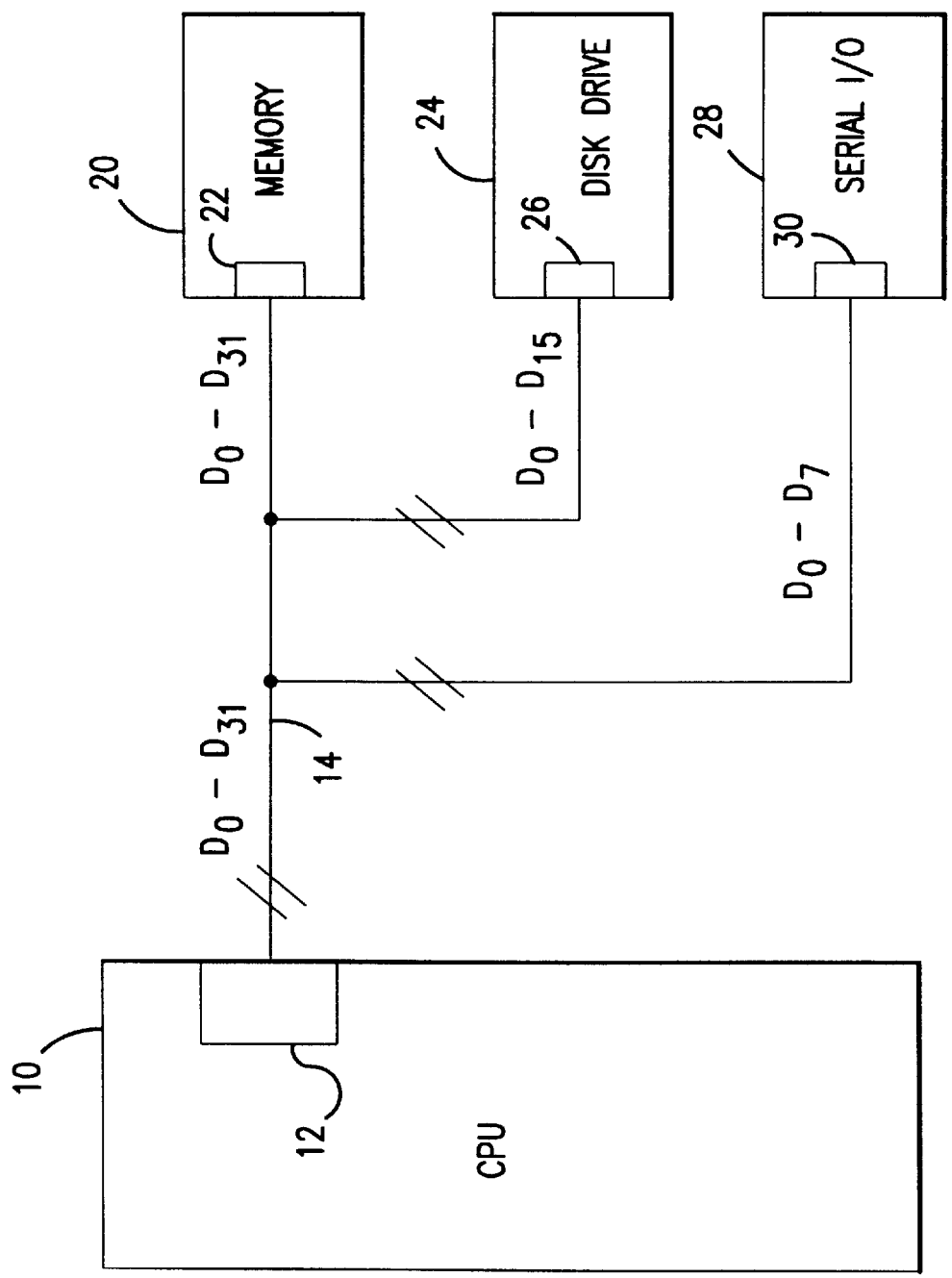
FIG. 1 is a block diagram of a computer system that utilizes a prior art computer bus.
Figure 2:
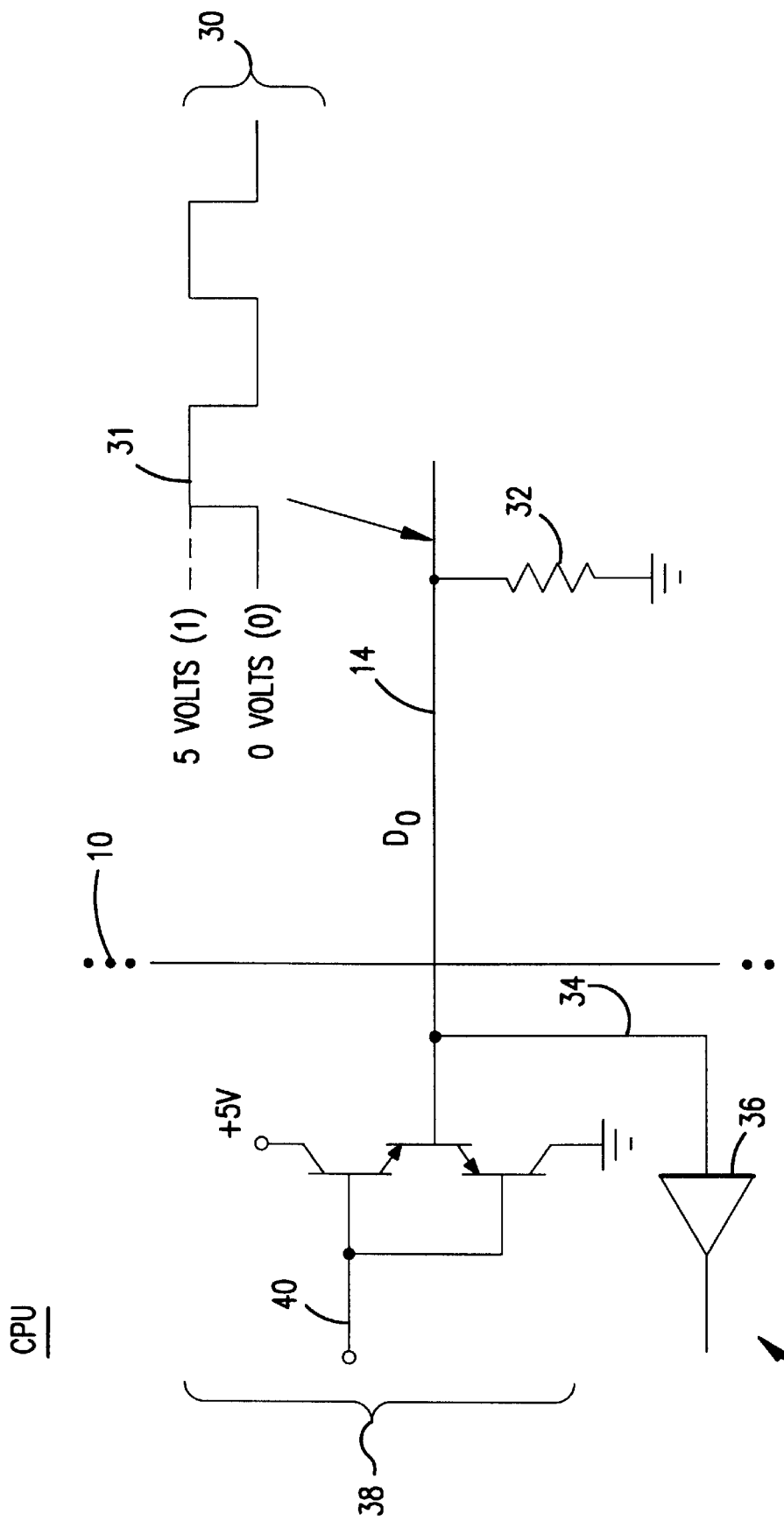
FIG. 2 is a detailed view of a prior art bus driver/receiver included in the computer system shown in FIG. 1.

The bus driver/receiver modules 48–51 are preferably an integrated component within each device of the computer system coupled to the bus 50, as shown in FIG. 3. However, in the alternative, each device can be coupled to an external driver/receiver module 48–51 which is in turn coupled to the bus 50 and the reference line 52. This arrangement allows prior art devices that contain integrated prior art driver/receiver modules, such as the CPU 10 in FIG. 2, to be used with the present invention.

Figure 4:
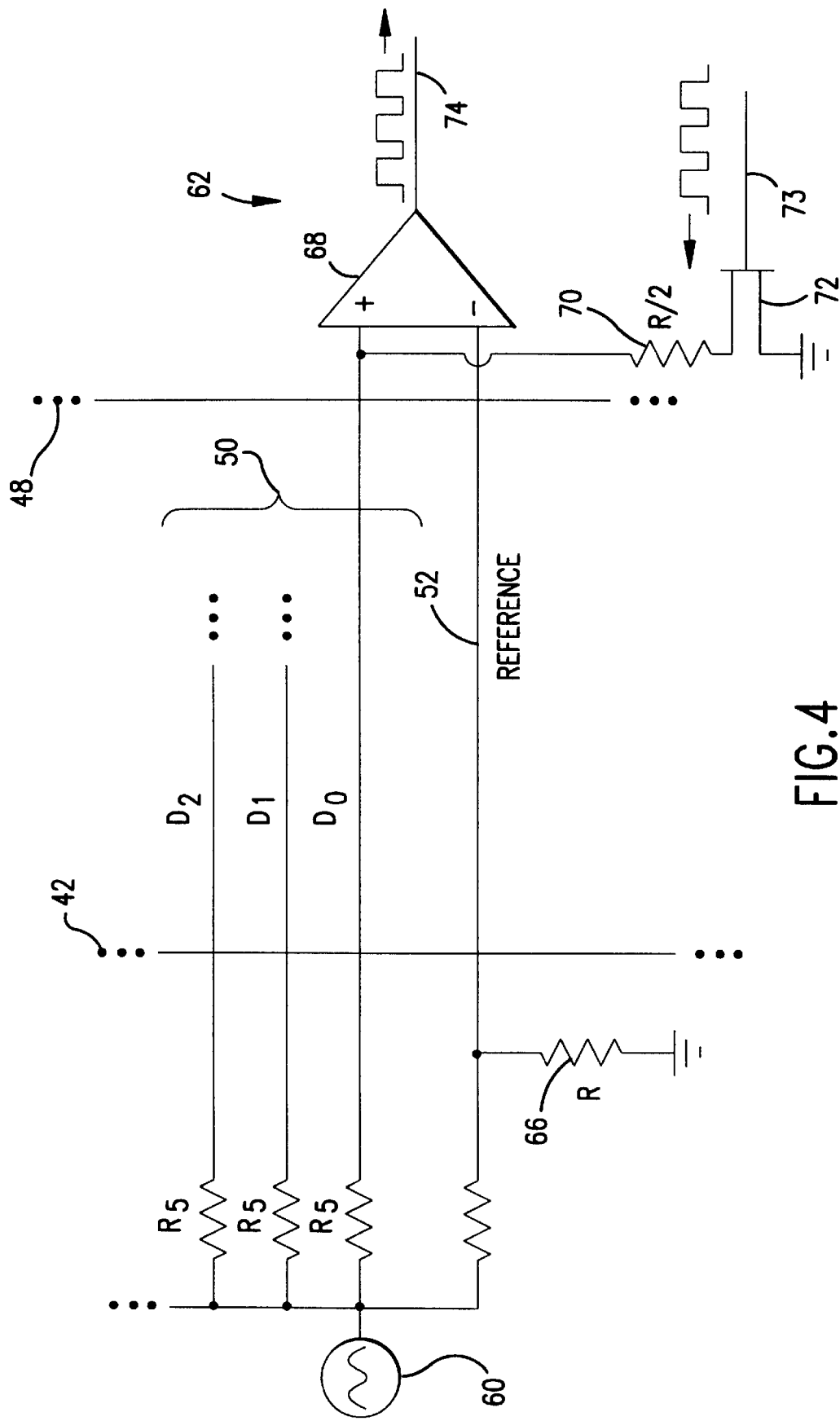
FIG. 4 is a detailed view of a bus generator and a bus driver/receiver of the present invention.

FIG. 4 provides a detailed view of the bus generator 42 and a bus driver/receiver 62 within the bus driver/receiver module 48 corresponding to line D0 of bus 50. The bus driver/receiver 62 is identical to all of the bus driver/receivers included in the bus driver/receiver modules 48–51 shown in FIG. 3.

The bus generator 42 includes a oscillator 60 that generates a sinusoidal wave. The oscillator 60 is preferably a Colpitts oscillator, but it can be any type of oscillator, or any other device capable of generating a sinusoidal wave. The output of the oscillator 60 is fanned out to each line $D_0$–$D_{31}$ of the bus 50, and to the reference line 52. Each line $D_0$–$D_{31}$ and the reference line 52 includes a source resistance having a resistance value of $R_s$. The reference line 52 is coupled to ground through resistor 66 which has a resistance value of R. This attenuates the amplitude of the signal transmitted on the reference line 52.

The bus driver/receiver 62 includes a comparator 68 coupled to the bus line $D_0$ and the reference line 52. The comparator 68 compares the amplitude of the bus line $D_0$ signal to the reference line 52 signal. If the amplitude of the bus line $D_0$ signal is greater than the amplitude of the reference line 52 signal, the comparator 68 outputs a digital "1" on line 74. If the amplitude of the bus line $D_0$ is less than the amplitude of the reference line 52, the comparator 68 outputs a digital "0" on line 74.

The bus driver/receiver 62 further includes a switch 72. The switch 72 can be a transistor, or any other device that allows high frequency switching. The switch 72 is coupled to bus line D0 of bus 50 through a resistor 70. The resistor 70 has a value R/2, or some other level lower than the value of resistor 66. The switch 72 is also coupled to ground. The CPU 48 drives a digital "0" on bus line $D_0$ of bus 50 by turning the switch 72 on, i.e., closing the switch 72 through line 73. This allows current to flow from bus line $D_0$ through resistor 70 to ground, which attenuates the signal on bus line $D_0$. The amplitude of the signal on bus line $D_0$ when switch 72 is on is less than the amplitude of the signal on reference line 52 because resistor 70 has a lower resistance than resistor 66. The CPU 48 drives a digital "1" on the bus line $D_0$ of bus 50 by turning the switch 72 off, i.e., opening the switch 72. When the switch 72 is off, the amplitude of the non-attenuated signal on bus line $D_0$ is greater than the amplitude of the signal on the reference line 52.

Other protocols can be used to drive a digital "1" or "0" on bus line $D_0$, as long as the protocols allow the comparator 68 to distinguish a digital "1" or "0" on the bus lines from the reference line 52 signal. For example, the signal on bus line $D_0$ can be amplified to represent a digital "1" and the signal on the reference line 52 can also be amplified a lesser amount. A digital "0" in this protocol would be a non-amplified signal on bus line $D_0$. Further, the signal on the bus line $D_0$ can be amplified to represent a digital "1" and attenuated to represent a digital "0". Using this protocol, the reference line amplitude would not have to be modified.

Figure 5:
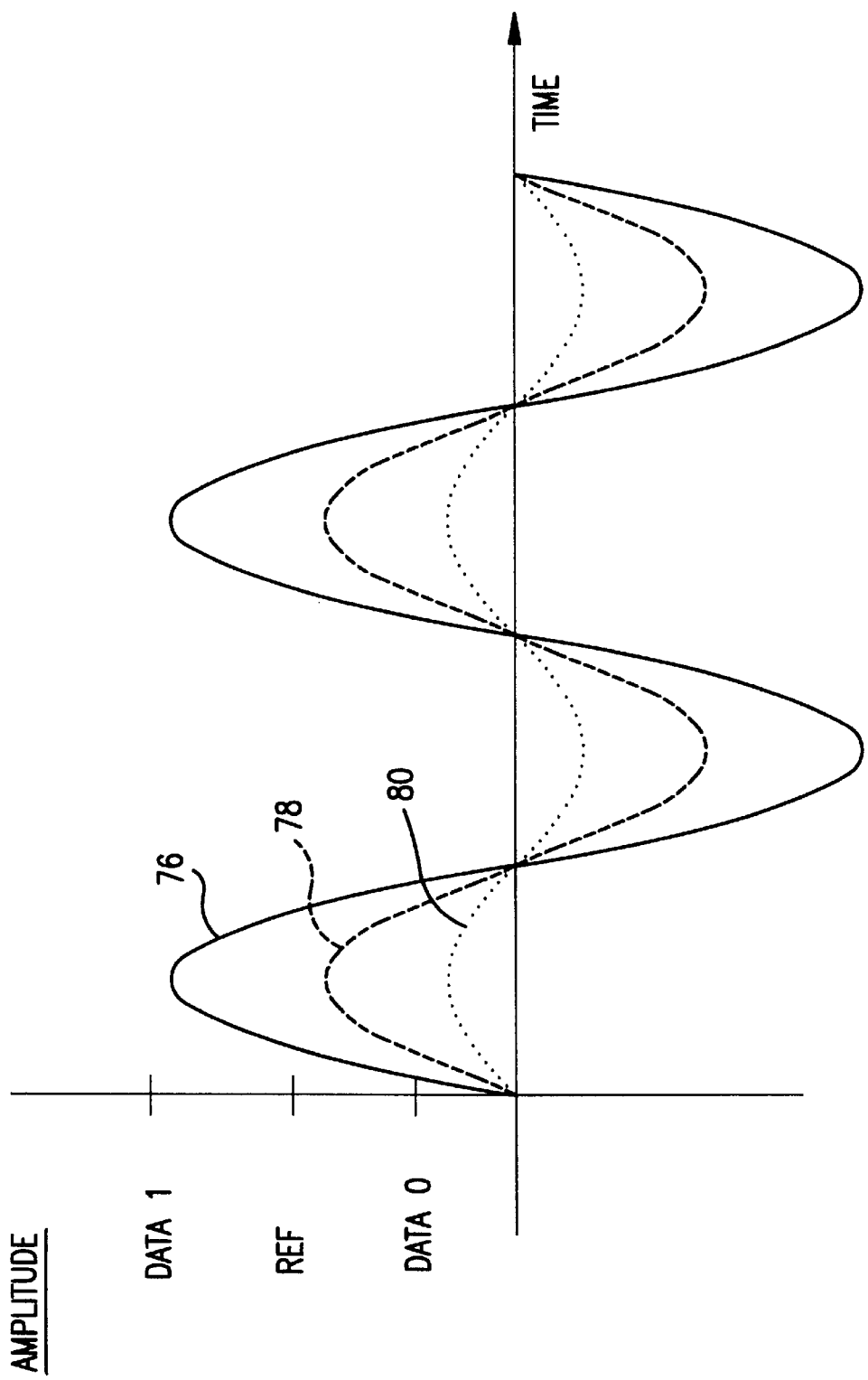
FIG. 5 is an illustration of representative signals on the bus lines and the reference line of the present invention.

FIG. 5 illustrates representative signals on the bus 50 and the reference line 52. Sinusoidal wave 78 with an amplitude of REF is representative of the signal on reference line 52. Sinusoidal wave 76 with an amplitude of Data 1 is representative of the signal on bus 50 when a digital "1" is being driven by switch 72. Data 1 is greater than REF. Sinusoidal wave 80 with an amplitude of Data 0 is representative of the signal on bus 50 when a digital "0" is being driven by switch 72. Data 0 is less than REF.

The computer bus of the present invention overcomes the problems associated with prior art busses. Specifically, signal skew is not a problem with the present invention because data is driven on the bus 50 by attenuating the signal for a digital "0" and by not attenuating the signal for a digital "1". The entire sinusoidal wave on bus 50 is instantaneously attenuated when the switch 72 is turned on. Therefore, all devices coupled to the bus 50 will read a digital "1" or "0" on lines $D_0$–$D_{31}$ of bus 50 at the same time regardless of the length of the bus lines or the loads on the bus lines.

Further, the signals on lines $D_0$–$D_{31}$ of bus 50 and on the reference line 52 are single sinusoidal waves 76, 78, 80 which comprise a single harmonic or frequency. Therefore, only one harmonic generates EMI radiation for the entire computer system. The total EMI radiation for a computer system using the computer bus of the present invention is substantially less than the EMI radiation for a computer system using the prior art bus in which an infinite series of harmonics comprising a square wave generate EMI radiation.

In addition, the oscillator 60 constantly drives a sinusoidal wave along the bus 50 and the reference line 52. Each line $D_0$–$D_{31}$ will always be read by the devices in the computer system as a digital "1" unless the sinusoidal wave is attenuated by the switch 72, in which case a digital "0" is read. Therefore, the lines $D_0$–$D_{31}$ of the bus 50 are never allowed to float into an unknown state, and pull-up and pull-down loads are not needed.

Finally, a single oscillator 62 drives the bus lines $D_0$–$D_{31}$ and the reference line 52. The oscillator 62 can be easily tuned using known techniques of tuning oscillators. Therefore, reflection on the bus 50 is eliminated without using termination.

What is claimed is:

1. A constant frequency bus comprising:
    a sinusoidal wave generator having a sinusoidal wave output;
    a reference line coupled to said generator output that transmits the sinusoidal wave;
    a plurality of bus lines coupled to said generator output that transmit the sinusoidal wave;
    a first amplitude modifier coupled to one of said bus lines; and
    a comparator coupled to said reference line and said bus line, said comparator comparing the amplitude of the sinusoidal wave on said bus line with the amplitude of the sinusoidal wave on said reference line and generating a digital output.

2. The constant frequency bus of claim 1, further comprising:
    a second amplitude modifier coupled to said reference line.

3. The constant frequency bus of claim 2, wherein said first amplitude modifier comprises:
    a switch that attenuates the sinusoidal wave on said bus line when said switch is on.

4. The constant frequency bus of claim 2, wherein said first amplitude modifier comprises:
    a first resistor and a switch coupled in series between said bus line and ground.

5. The constant frequency bus of claim 4, wherein said switch comprises a semiconductor switch having an input.

6. The constant frequency bus of claim 5, wherein said switch turns on in response to one binary value at said input, and turns off in response to the other binary value at said input.

7. The constant frequency bus of claim 4, wherein said second amplitude modifier comprises a second resistor coupled between said reference line and ground.

8. The constant frequency bus of claim 7, wherein said second resistor has a greater resistance value than said first resistor.

9. The constant frequency bus of claim 8, wherein said digital output is one binary value when the amplitude of the sinusoidal wave on said bus line is greater than the amplitude of the sinusoidal wave on said reference line, and said digital output is the other binary value when the amplitude of the sinusoidal wave on said bus line is less than the amplitude of the sinusoidal wave on said reference line.

10. The constant frequency bus of claim 9, wherein said switch comprises a transistor.

11. A method of operating a bus, comprising the steps of:
    generating a sinusoidal wave;
    transmitting the sinusoidal wave on a plurality of bus lines and a reference line;
    modifying the amplitude of the sinusoidal wave on one of said bus lines;
    comparing the amplitude of the sinusoidal wave on said bus line with the amplitude of the sinusoidal wave on said reference line; and
    generating a digital output based on said comparison.

12. The method of claim 11, further comprising the step of:
    modifying the amplitude of the sinusoidal wave on said reference line.

13. The method of claim 12, wherein said step of modifying the amplitude of the sinusoidal wave on said bus line comprises the steps of:
    inputting a digital input to a switch;
    turning off said switch if said digital input is one binary value;
    turning on said switch if said digital input is the other binary value; and
    attenuating the sinusoidal wave on said bus line to a first amplitude if said switch is turned on.

14. The method of claim 13, wherein said step of modifying the amplitude of the sinusoidal wave on said reference line comprises the step of:
    attenuating the sinusoidal wave on said bus line to a second amplitude, wherein said second amplitude is greater than said first amplitude.

15. The method of claim 14, wherein said digital output is one binary value when the amplitude of the sinusoidal wave on said bus line is greater than the amplitude of the sinusoidal wave on said reference line, and said digital output is the other binary value when the amplitude of the sinusoidal wave on said bus line is less than the amplitude of the sinusoidal wave on said reference line.

16. A computer system comprising:
    a sinusoidal wave generator having a sinusoidal wave output;
    a reference line coupled to said generator output that transmits the sinusoidal wave;
    a plurality of bus lines coupled to said generator output that transmit the sinusoidal wave;
    a first amplitude modifier coupled to one of said bus lines;
    a comparator coupled to said reference line and said bus line, said comparator comparing the amplitude of the sinusoidal wave on said bus line with the amplitude of the sinusoidal wave on said reference line and generating a digital output; and
    a central processing unit coupled to said first amplitude modifier and said comparator.

17. The computer system of claim 16, further comprising:
    a second amplitude modifier coupled to said reference line.

18. The computer system of claim 17, wherein said first amplitude modifier comprises:
    a switch that attenuates the sinusoidal wave on said bus line when said switch is on.

19. The computer system of claim 17, wherein said first amplitude modifier further comprises:
    a first resistor and a switch coupled in series between said bus line and ground.

20. The computer system of claim 19, wherein said switch comprises a semiconductor switch having an input.

21. The computer system of claim 20, wherein said switch turns on in response to one binary value at said input, and turns off in response to the other binary value at said input.

22. The computer system of claim 19, wherein said second amplitude modifier comprises a second resistor coupled between said reference line and ground.

23. The computer system of claim 22, wherein said second resistor has a greater resistance value than said first resistor.

24. The computer system of claim 23, wherein said digital output is one binary value when the amplitude of the sinusoidal wave on said bus line is greater than the amplitude of the sinusoidal wave on said reference line, and said digital output is the other binary value when the amplitude of the sinusoidal wave on said bus line is less than the amplitude of the sinusoidal wave on said reference line.

25. The computer system of claim 24, wherein said switch comprises a transistor.

26. The computer system of claim 16, further comprising:
   a first device coupled to a first group of said plurality of bus lines;
   a second device coupled to a second group of said plurality of bus lines; and
   a third device coupled to a third group of said plurality of bus lines.

* * * * *